US012666491B2

(12) United States Patent
Fu et al.

(10) Patent No.: US 12,666,491 B2
(45) Date of Patent: Jun. 23, 2026

(54) INFORMATION PROCESSING METHOD AND DEVICE, USER EQUIPMENT, AND READABLE STORAGE MEDIUM

(71) Applicant: DATANG MOBILE COMMUNICATIONS EQUIPMENT CO., LTD., Beijing (CN)

(72) Inventors: Jing Fu, Beijing (CN); Haiyang Quan, Beijing (CN); Jianxiang Li, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 699 days.

(21) Appl. No.: 18/005,635

(22) PCT Filed: Jul. 23, 2021

(86) PCT No.: PCT/CN2021/108164
§ 371 (c)(1),
(2) Date: Jan. 16, 2023

(87) PCT Pub. No.: WO2022/017503
PCT Pub. Date: Jan. 27, 2022

(65) Prior Publication Data
US 2023/0276521 A1      Aug. 31, 2023

(30) Foreign Application Priority Data
Jul. 24, 2020    (CN) .......................... 202010728439.1

(51) Int. Cl.
*H04W 76/27*        (2018.01)
*H04W 64/00*        (2009.01)
(52) U.S. Cl.
CPC ........... *H04W 76/27* (2018.02); *H04W 64/00* (2013.01)

(58) Field of Classification Search
CPC . H04W 76/27; H04W 64/00; H04W 52/0209; H04W 52/0216; H04W 76/20;
(Continued)

(56) References Cited

U.S. PATENT DOCUMENTS

2018/0343635 A1    11/2018   Edge et al.
2019/0182794 A1*    6/2019   Wong ................ H04W 52/0216
(Continued)

FOREIGN PATENT DOCUMENTS

CN         101164280 A      4/2008
CN         101883427 A      11/2010
(Continued)

OTHER PUBLICATIONS

Extended European Search Report issued Dec. 1, 2023 in European Application No. 21845881.8.
(Continued)

*Primary Examiner* — Joseph Arevalo
(74) *Attorney, Agent, or Firm* — Harness, Dickey & Pierce, P.L.C.

(57)                ABSTRACT

The present disclosure provides an information processing method, a UE, a device, and a readable storage medium. The information processing method includes transmitting, by the UE in an RRC non-connected state, a first message to a network device through directly transmitting a UL message, the first message including information related to the positioning of the UE in the RRC non-connected state. The UE in the RRC non-connected state includes at least one of a UE in an RRC idle state or a UE in an RRC inactive state.

15 Claims, 4 Drawing Sheets

(58) Field of Classification Search
CPC ....... H04W 76/30; H04W 4/14; H04W 48/02;
H04W 48/06; H04W 48/14; H04W 48/16;
H04W 48/20; H04W 64/003; H04W
72/23; H04W 76/19; H04W 88/18
USPC .......................... 370/338, 352, 329, 315, 310
See application file for complete search history.

(56) References Cited

U.S. PATENT DOCUMENTS

| | | | | |
|---|---|---|---|---|
| 2019/0350020 | A1 | 11/2019 | Kim et al. | |
| 2019/0394746 | A1* | 12/2019 | Edge et al. | |
| 2020/0015311 | A1* | 1/2020 | Kim | H04W 68/005 |
| 2020/0045666 | A1 | 2/2020 | Edge et al. | |
| 2021/0337501 | A1 | 10/2021 | Si et al. | |
| 2021/0345124 | A1* | 11/2021 | Myung | H04L 27/0006 |
| 2022/0078872 | A1* | 3/2022 | Shrestha | H04W 68/12 |
| 2023/0262818 | A1* | 8/2023 | Kim | H04W 76/19 |
| | | | | 370/328 |
| 2023/0262837 | A1* | 8/2023 | Hao | H04W 76/27 |
| | | | | 370/329 |
| 2024/0008130 | A1* | 1/2024 | Kim | H04W 4/14 |
| 2024/0334533 | A1* | 10/2024 | Li | G01S 5/021 |
| 2025/0184843 | A1* | 6/2025 | Chen | H04W 72/231 |

FOREIGN PATENT DOCUMENTS

| | | | |
|---|---|---|---|
| CN | 110651512 | A | 1/2020 |
| CN | 111343567 | A | 6/2020 |
| WO | WO-2019/215673 | A1 | 11/2019 |
| WO | WO-2020/065619 | A1 | 4/2020 |
| WO | WO-2020/140668 | A1 | 7/2020 |

OTHER PUBLICATIONS

International Search Report and Written Opinion issued Oct. 13, 2021 in International Application No. PCT/CN2021/108164.
First Office Action issued Jun. 6, 2022 in Chinese Application No. 202010728439.1.
Second Office Action issued Nov. 30, 2022 in Chinese Application No. 202010728439.1.

* cited by examiner

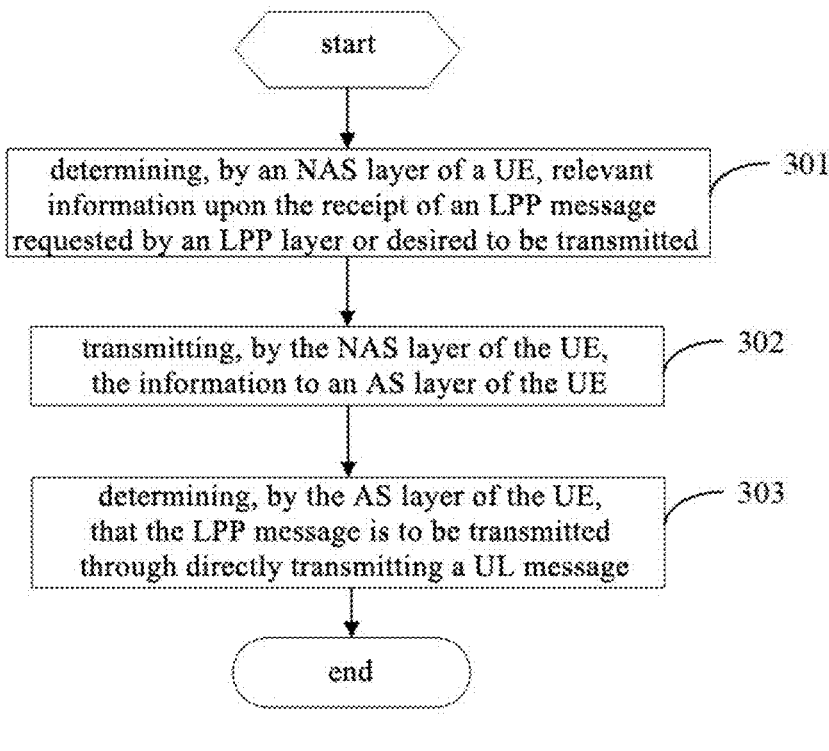

start determining, by an NAS layer of a UE, relevant
information upon the receipt of an LPP message
requested by an LPP layer or desired to be transmitted          301 transmitting, by the NAS layer of the UE,
the information to an AS layer of the UE          302 determining, by the AS layer of the UE,
that the LPP message is to be transmitted
through directly transmitting a UL message          303 end

FIG. 3

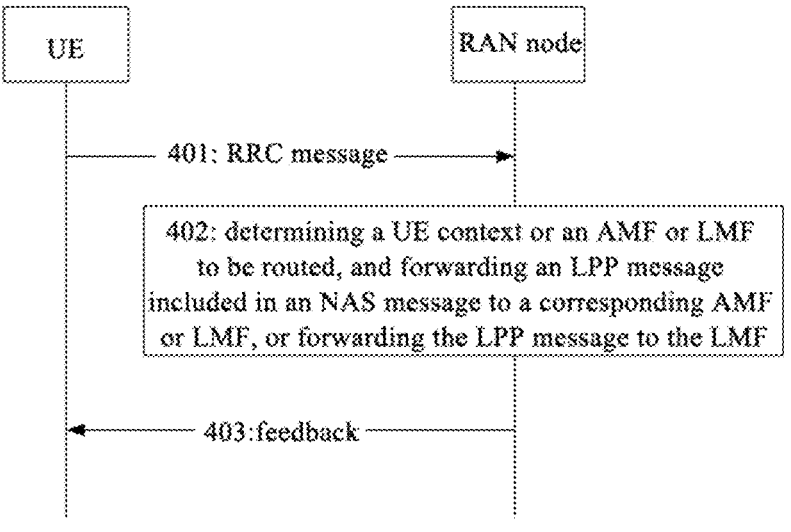

UE      RAN node

401: RRC message

402: determining a UE context or an AMF or LMF
to be routed, and forwarding an LPP message
included in an NAS message to a corresponding AMF
or LMF, or forwarding the LPP message to the LMF 403:feedback

FIG. 4

INFORMATION PROCESSING METHOD AND DEVICE, USER EQUIPMENT, AND READABLE STORAGE MEDIUM

CROSS-REFERENCE TO RELATED APPLICATIONS

This application is a U.S. national phase of PCT Application No. PCT/CN2021/108164 filed on Jul. 23, 2021 which claims a priority of the Chinese patent application No. 202010728439.1 filed on Jul. 24, 2020, both of which are incorporated by reference herein in their entirety.

TECHNICAL FIELD

The present disclosure relates to the field of communication technology, in particular to an information processing method, a User Equipment (UE), an information processing device, and a readable storage medium.

BACKGROUND

In New Radio (NR), a UE may be in three Radio Resource Control (RRC) states, i.e., an RRC idle (RRC_IDLE) state, an RRC connected (RRC_CONNECTED) state and an RRC inactive (RRC_INACTIVE) state. When there is an RRC connection between the UE and a network device, the UE is in the connected state or the inactive state, otherwise, the UE is in the idle state. At one time point, the UE is merely in one RRC state.

A $5^{th}$-Generation (5G) NR positioning technology supports the positioning of the UE in the RRC connected state. However, the UE is also probably positioned in a non-connected state (including the RRC idle state and the RRC inactive state). At this time, the UE in the non-connected state needs to interact with a network side, so as to, e.g., obtain desired auxiliary information or report a positioning measurement result. In the related art, the UE needs to be triggered to enter the RRC connected state, resulting in such problems as a large delay.

SUMMARY

An object of the present disclosure is to provide an information processing method, a UE, an information processing device, and a readable storage medium, so as to reduce the delay.

In a first aspect, the present disclosure provides in some embodiments an information processing method for a UE, including transmitting, by the UE in an RRC non-connected state, a first message to a network device through directly transmitting an Uplink (UL) message, the first message including information related to the positioning of the UE in the RRC non-connected state. The UE in the RRC non-connected state includes at least one of a UE in an RRC idle state or a UE in an RRC inactive state.

In some possible embodiments of the present disclosure, the first message is any of a Non-Access Stratum (NAS) message carrying a Long Term Evolution (LTE) Positioning Protocol (LPP) message, or the LPP message.

In some possible embodiments of the present disclosure, the transmitting the first message to the network device through directly transmitting the UL message includes: transmitting the first message to the network device through a Common Control Channel (CCCH); or transmitting the first message through the CCCH and a Dedicated Control Channel (DCCH).

In some possible embodiments of the present disclosure, the transmitting the first message to the network device through the CCCH includes transmitting a first RRC message to the network device through the CCCH, and the first RRC message includes the first message, and a cause for RRC connection setup or a cause for RRC connection resume.

In some possible embodiments of the present disclosure, when the UE is a UE in the RRC inactive state, the first RRC message further includes an Inactive Radio Network Temporary Identity (I-RNTI) and a resume Message Authentication Code for Integrity (MAC-I); or when the UE is a UE in the RRC idle state, the first RRC message further includes a route identifier; or the first RRC message further includes first indication information, the first indication information is used to indicate whether there is a subsequent message, and the subsequent message includes at least one of an uplink message or a downlink message.

In some possible embodiments of the present disclosure, the transmitting the first message through the CCCH and the DCCH at least includes: transmitting a second RRC message to the network device, the second RRC message including the first message; or transmitting a third RRC message to the network device, the third RRC message being used to perform at least one of assisting the network device to obtain a context of the UE, assisting the network device to determine a location management server which serves the UE, or assisting the network device to control the switching of an RRC state.

In some possible embodiments of the present disclosure, the second RRC message further includes second indication information, the second indication information is used to indicate whether there is a subsequent message, and the subsequent message includes at least one of an uplink message or a downlink message.

In some possible embodiments of the present disclosure, the information processing method further includes receiving an RRC response message from the network device. The RRC response message is used to indicate at least one of: that the NAS message has been forwarded successfully; that the LPP message included in the NAS message has been forwarded successfully; that the RRC response message includes an NAS message received by the network device and responded by a core network, and the NAS message responded by the core network includes the LPP message; or that the LPP message has been forwarded successfully.

In some possible embodiments of the present disclosure, prior to transmitting the first message to the network device through directly transmitting the UL message, the information processing method further includes: receiving, by an Access Stratum (AS) entity of the UE, first information from an NAS entity of the UE; and determining, by the AS entity of the UE, whether to transmit the first message to the network device through directly transmitting the UL message in accordance with the first information, so as to obtain a determination result. The first information includes at least one of: a cause for RRC connection setup or for RRC connection resume; whether data to be transmitted to the network device is LPP data or positioning data; or whether a subsequent message needs to be transmitted, and the subsequent message includes at least one of an uplink message or a downlink message.

In some possible embodiments of the present disclosure, the determining, by the AS entity of the UE, whether to transmit the first message to the network device through directly transmitting the UL message in accordance with the first information so as to obtain the determination result includes determining, by the AS entity of the UE, whether to transmit the first message to the network device through directly transmitting the UL message in accordance with a capability of the UE and a configuration of the network device, so as to obtain the determination result.

In some possible embodiments of the present disclosure, the first information further includes at least one of a to-be-transmitted LPP message packaged in the NAS message, or a route identifier.

In some possible embodiments of the present disclosure, the information processing method further includes transmitting, by the AS entity of the UE, the determination result to the NAS entity of the UE.

In a second aspect, the present disclosure provides in some embodiments an information processing method for a network device, including: receiving a first message from a UE in a non-connected state, the first message being transmitted by the UE in the non-connected state through directly transmitting a UL message, the first message including information related to the positioning of the UE in the RRC non-connected state; and forwarding the first message to an Access and Mobility Management Function (AMF) or a Location Management Function (LMF). The UE in the RRC non-connected state includes at least one of a UE in an RRC idle state or a UE in an RRC inactive state.

In some possible embodiments of the present disclosure, the first message is any of an NAS message carrying an LPP message, or the LPP message.

In some possible embodiments of the present disclosure, the information processing method further includes transmitting an RRC response message to the UE. The RRC response message is used to indicate at least one of: that the NAS message has been forwarded successfully; that the LPP message included in the NAS message has been forwarded successfully; that the RRC response message includes an NAS message received by the network device and responded by a core network, and the NAS message responded by the core network includes the LPP message; or that the LPP message has been forwarded successfully.

In a third aspect, the present disclosure provides in some embodiments a UE, including a first transmission module configured to transmit a first message to a network device through directly transmitting a UL message when the UE is in a non-connected state, the first message including information related to the positioning of the UE in the RRC non-connected state. The UE in the RRC non-connected state includes at least one of a UE in an RRC idle state or a UE in an RRC inactive state.

In a fourth aspect, the present disclosure provides in some embodiments a network device, including: a first reception module configured to receive a first message from a UE in a non-connected state, the first message being transmitted by the UE in the non-connected state through directly transmitting a UL message, the first message including information related to the positioning of the UE in the RRC non-connected state; and a first processing module configured to forward the first message to an AMF or an LMF. The UE in the RRC non-connected state includes at least one of a UE in an RRC idle state or a UE in an RRC inactive state.

In a fifth aspect, the present disclosure provides in some embodiments a UE, including a transceiver, a memory, a processor, and a program stored in the memory and executed by the processor. The processor is configured to read a program in the memory, so as to transmit a first message to a network device through directly transmitting a UL message when the UE is in an RRC non-connected state, the first message including information related to the positioning of the UE in the RRC non-connected state. The UE in the RRC non-connected state includes at least one of a UE in an RRC idle state or a UE in an RRC inactive state.

In some possible embodiments of the present disclosure, the first message is any of an NAS message carrying an LPP message, or the LPP message.

In some possible embodiments of the present disclosure, the processor is further configured to read the program in the memory, so as to: transmit the first message to the network device through a CCCH; or transmit the first message through the CCCH and a DCCH.

In some possible embodiments of the present disclosure, the processor is further configured to read the program in the memory, so as to transmit a first RRC message to the network device through the CCCH, and the first RRC message includes the first message, and a cause for RRC connection setup or a cause for RRC connection resume.

In some possible embodiments of the present disclosure, when the UE is a UE in the RRC inactive state, the first RRC message further includes an I-RNTI and a resume MAC-I; or when the UE is a UE in the RRC idle state, the first RRC message further includes a route identifier; or the first RRC message further includes first indication information, the first indication information is used to indicate whether there is a subsequent message, and the subsequent message includes at least one of an uplink message or a downlink message.

In some possible embodiments of the present disclosure, the processor is further configured to read the program in the memory, so as to: transmit a second RRC message to the network device, the second RRC message including the first message; or transmit a third RRC message to the network device, the third RRC message being used to perform at least one of assisting the network device to obtain a context of the UE, assisting the network device to determine a location management server which serves the UE, or assisting the network device to control the switching of an RRC state.

In some possible embodiments of the present disclosure, the second RRC message further includes second indication information, the second indication information is used to indicate whether there is a subsequent message, and the subsequent message includes at least one of an uplink message or a downlink message.

In some possible embodiments of the present disclosure, the processor is further configured to read the program in the memory, so as to receive an RRC response message from the network device. The RRC response message is used to indicate at least one of: that the NAS message has been forwarded successfully; that the LPP message included in the NAS message has been forwarded successfully; that the RRC response message includes an NAS message received by the network device and responded by a core network, and the NAS message responded by the core network includes the LPP message; or that the LPP message has been forwarded successfully.

In some possible embodiments of the present disclosure, the processor is further configured to read the program in the memory, so as to: enable an AS entity of the UE to receive first information from an NAS entity of the UE; and enable the AS entity of the UE to determine whether to transmit the first message to the network device through directly transmitting the UL message in accordance with the first information, so as to obtain a determination result. The first information includes at least one of: a cause for RRC connection setup or for RRC connection resume; whether data to be transmitted to the network device is LPP data or positioning data; or whether a subsequent message needs to be transmitted, and the subsequent message includes at least one of an uplink message or a downlink message.

In some possible embodiments of the present disclosure, the processor is further configured to read the program in the memory, so as to enable the AS entity of the UE to determine whether to transmit the first message to the network device through directly transmitting the UL message in accordance with a capability of the UE and a configuration of the network device, so as to obtain the determination result.

In some possible embodiments of the present disclosure, the processor is further configured to read the program in the memory, so as to enable the AS entity of the UE to transmit the determination result to the NAS entity of the UE.

In a sixth aspect, the present disclosure provides in some embodiments a network device, including a transceiver, a memory, a processor, and a program stored in the memory and executed by the processor. The processor is configured to read the program in the memory, so as to: receive a first message from a UE in a non-connected state, the first message being transmitted by the UE in the non-connected state through directly transmitting a UL message, the first message including information related to the positioning of the UE in the RRC non-connected state; and forward the first message to an AMF or an LMF. The UE in the RRC non-connected state includes at least one of a UE in an RRC idle state or a UE in an RRC inactive state.

In some possible embodiments of the present disclosure, the first message is any of an NAS message carrying an LPP message, or the LPP message.

In some possible embodiments of the present disclosure, the processor is further configured to read the program in the memory, so as to transmit an RRC response message to the UE. The RRC response message is used to indicate at least one of: that the NAS message has been forwarded successfully; that the LPP message included in the NAS message has been forwarded successfully; that the RRC response message includes an NAS message received by the network device and responded by a core network, and the NAS message responded by the core network includes the LPP message; or that the LPP message has been forwarded successfully.

In a seventh aspect, the present disclosure provides in some embodiments a readable storage medium storing therein a program. The program is executed by a processor so as to implement the steps of the above-mentioned information processing method.

According to the embodiments of the present disclosure, the first message is reported to the network device when the UE is in the non-connected state, so as to position the UE. As a result, it is able to transmit the first message even without switching the UE to be in an RRC connected state, thereby to reduce the delay.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 3 is yet another flow chart of the information processing method according to one embodiment of the present disclosure;

FIG. 4 is still yet another flow chart of the information processing method according to one embodiment of the present disclosure;

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
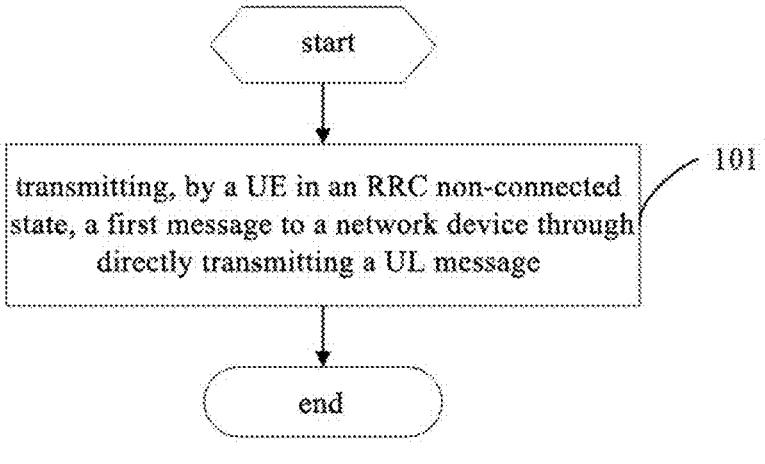
FIG. 1 is a flow chart of an information processing method according to one embodiment of the present disclosure.

As shown in FIG. 1, the present disclosure provides in some embodiments an information processing method for a UE, which includes Step 101 of transmitting, by the UE in an RRC non-connected state, a first message to a network device through directly transmitting a UL message, the first message including information related to the positioning of the UE in the RRC non-connected state. For example, through the first message, the UE may perform such an operation as requesting for positioning auxiliary information, reporting a positioning result, or triggering the positioning.

The UE in the RRC non-connected state includes at least one of a UE in an RRC idle state or a UE in an RRC inactive state.

In the embodiments of the present disclosure, the first message is any of an NAS message carrying an LPP message, or the LPP message.

In the embodiments of the present disclosure, the first message is transmitted to the network device in various modes.

(1) The first message is transmitted to the network device through a CCCH.

To be specific, in this mode, a first RRC message is transmitted to the network device through the CCCH, and the first RRC message includes the first message, and a cause for RRC connection setup or RRC connection resume.

In order to further improve positioning efficiency, there is at least one of the following circumstances for the first RRC message.

(a) When the UE is a UE in the RRC inactive state, the first RRC message further includes an I-RNTI and a resume MAC-I.

(b) When the UE is a UE in the RRC idle state, the first RRC message further includes a route identifier.

(c) The first RRC message includes first indication information, the first indication information is used to indicate whether there is a subsequent message, and the subsequent message includes at least one of an uplink message or a downlink message.

In this mode, the UE further receives an RRC response message from the network device. The RRC response message is used to indicate at least one of: that the NAS message has been forwarded successfully; that the LPP message included in the NAS message has been forwarded successfully; that the RRC response message includes an NAS message received by the network device and responded by a core network, and the NAS message responded by the core network includes the LPP message; or that the LPP message has been forwarded successfully.

(2) The first message is transmitted through the CCCH and a DCCH.

To be specific, the UE transmits a second RRC message and a third RRC message to the network device. The second RRC message includes the first message. The third RRC message is used to perform at least one of assisting the network device to obtain a context of the UE, assisting the network device to determine a location management server which serves the UE, or assisting the network device to control the switching of an RRC state.

In this mode, a correspondence between each of the CCCH and the DCCH and the transmitted RRC message is not particularly defined, i.e., each of the CCCH and the DCCH may transmit any of the second RRC message and the third RRC message.

In addition, the second RRC message further includes second indication information, the second indication information is used to indicate whether there is a subsequent message, and the subsequent message includes at least one of an uplink message or a downlink message.

In this mode, the UE further receives an RRC response message from the network device. The RRC response message is used to indicate at least one of: that the NAS message has been forwarded successfully; that the LPP message included in the NAS message has been forwarded successfully; that the RRC response message includes an NAS message received by the network device and responded by a core network, and the NAS message responded by the core network includes the LPP message; or that the LPP message has been forwarded successfully.

In the above two modes, an AS entity of the UE further forwards the RRC response message to an NAS entity of the UE.

Based on the above, in order to facilitate the processing by the UE, prior to Step 101, the AS entity of the UE receives first information from the NAS entity of the UE, and determines whether to transmit the first message to the network device through directly transmitting the UL message in accordance with the first information, so as to obtain a determination result.

To be specific, the AS entity of the UE determines whether to transmit the first message to the network device through directly transmitting the UL message in accordance with a capability of the UE (e.g., whether the UE supports to transmit the LPP message through directly transmitting the UL message, or whether the UE supports to transmitting data through directly transmitting the UL message) and a configuration of the network device (e.g., whether a desired configuration has been configured for the UE to transmit the LPP message through directly transmitting the UL message, or whether a desired configuration has been configured for the UE to transmit the data through directly transmitting the UL message), so as to obtain the determination result.

The first information includes at least one of: a cause for RRC connection setup or for RRC connection resume; whether data to be transmitted to the network device is LPP data or positioning data; or whether a subsequent message needs to be transmitted, and the subsequent message includes at least one of an uplink message or a downlink message.

The cause for RRC connection setup or connection resume includes one or more of MO positioning (i.e., positioning initiated by the UE), MO small data for positioning (i.e., small data for positioning initiated by the UE), MO data (i.e., data initiated by the UE), MO small signaling (i.e., small signaling initiated by the UE), or MO small data (i.e., small data initiated by the UE). When the NAS entity of the UE determines the cause for RRC connection setup or connection resume, it is necessary to consider whether there is a subsequent UL message to be transmitted, or whether there is a subsequent DL message to be transmitted.

In some possible embodiments of the present disclosure, the first information further includes at least one of an LPP message packaged in the NAS message or a route identifier.

After obtaining the determination result, the AS entity of the EU transmits the determination result to the NAS entity of the UE.

According to the embodiments of the present disclosure, the first message is reported to the network device when the UE is in the non-connected state, so as to position the UE. As a result, it is able to transmit the first message even without switching the UE to be in an RRC connected state, thereby to reduce the delay.

Figure 2:
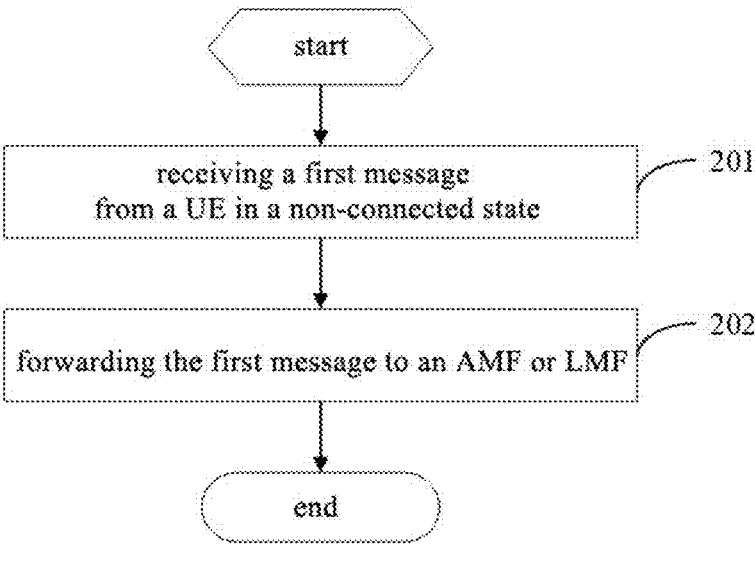
FIG. 2 is another flow chart of the information processing method according to one embodiment of the present disclosure.

As shown in FIG. 2, the present disclosure further provides in some embodiments an information processing method for a network device, which includes the following steps.

Step 201: receiving a first message from a UE in a non-connected state. The first message is transmitted by the UE in the non-connected state through directly transmitting a UL message, the first message includes information related to the positioning of the UE in the non-connected state. The UE in the RRC non-connected state includes at least one of a UE in an RRC idle state or a UE in an RRC inactive state.

Step 202: forwarding the first message to an AMF or an LMF.

The first message is any of an NAS message carrying an LPP message, or the LPP message.

In addition, based on the above, the information processing method further includes transmitting an RRC response message to the UE. The RRC response message is used to indicate at least one of: that the NAS message has been forwarded successfully; that the LPP message included in the NAS message has been forwarded successfully; that the RRC response message includes an NAS message received by the network device and responded by a core network, and the NAS message responded by the core network includes the LPP message; or that the LPP message has been forwarded successfully.

According to the embodiments of the present disclosure, the first message is reported to the network device when the UE is in the non-connected state, so as to position the UE. As a result, it is able to transmit the first message even without switching the UE to be in an RRC connected state, thereby to reduce the delay.

In one embodiment of the present disclosure, the UE is in the non-connected state (including the RRC_IDLE state and the RRC_INACTIVE state). At this time, when the UE is to be positioned, it needs to interact with the network device, and transmit the LPP message to the network device. After the UE in the non-connected state has been positioned, it needs to report a positioning measurement result or a positioning result to the network device. Alternatively, when the UE in the non-connected state is positioned, it needs to obtain desired auxiliary information through the network device. In this case, as shown in FIG. 3, the information processing method includes the following steps.

Step 301: after the NAS layer of the UE has received the LPP message requested by an LPP layer or desired to be transmitted by the LLP layer, determining one or more of the following pieces of information.

(1) Determining the cause for RRC connection setup or connection resume. The cause for RRC connection setup or connection resume includes one of MO positioning (i.e., positioning initiated by the UE), MO small data for positioning (i.e., small data for positioning initiated by the UE), MO data (i.e., data initiated by the UE), MO small signaling (i.e., small signaling initiated by the UE), or MO small data (i.e., small data initiated by the UE). When the NAS entity of the UE determines the cause for RRC connection setup or connection resume, it is necessary to consider whether there is a subsequent UL message to be transmitted, or whether there is a subsequent DL message to be transmitted.

In some possible embodiments of the present disclosure, when the NAS layer of the UE determines the cause for RRC connection setup or connection resume, the NAS layer of the UE needs to consider whether there is a subsequent UL message to be transmitted or whether there is a subsequent DL message to be transmitted. For example, when there is no subsequent UL message and/or DL message, the UE sets the cause for RRC connection setup or connection recover as one of MO small data for position (i.e., small data for positioning initiated by the UE), MO small signaling (i.e., small signaling initiated by the UE), or MO small data (i.e., small data initiated by the UE).

(2) Determining whether there is a subsequent DL message. The subsequent DL message is auxiliary information provided by an LPP layer of the UE.

(3) Determining whether there is a subsequent UL message to be transmitted. The UL message is auxiliary information provided by the LPP layer of the UE.

(4) Determining whether there is any other subsequent message. The message is auxiliary information provided by the LPP layer of the UE.

Step 302: transmitting, by the NAS layer of the UE, the above information to an AS layer of the UE.

In some possible embodiments of the present disclosure, the information further carries thereon one or more of (1) an LPP message packaged in the NAS message and desired to be transmitted, or (2) a route identifier for assisting the network device to determine an AMF storing therein a UE context and/or determine a positioning function serving the UE, e.g., an LMF.

Step 303: determining, by the AS layer of the UE, to transmit the LPP message through directly transmitting the UL message.

The AS layer of the UE receives the information provided by the NAS layer of the UE, and determines whether to transmit the LPP message from the NAS layer through directly transmitting the UL message in accordance with one or more of the cause of RRC connection setup or connection recover, whether there is the subsequent DL message or whether there is the subsequent UL message, in conjunction with the capability of the UE itself (i.e., whether the UE supports to transmit the LPP message through directly transmitting the UL message, or whether the UE supports to transmit data through directly transmitting the UL message) and a current configuration of the network device (i.e., whether a configuration has been configured for the UE to transmit the LPP message through directly transmitting the UL message, or whether a configuration has been configured for the UE to transmit the data through directly transmitting the UL message).

For example, the cause for RRC connection setup received by the AS layer of the UE is MO small data for positioning, and the UE supports to transmit the received NAS message through directly through the UL message. Further, the UE is provided with valid radio resources for transmitting the received NAS message through directly transmitting the UL message. At this time, the UE transmits the LPP message received from the NAS layer through directly transmitting the UL message. When the above conditions are not met, the UE transmits the LPP message received from the NAS layer in a conventional mode.

For example, the cause for RRC connection setup received by the AS layer of the UE is MO positioning (i.e., the positioning initiated by the UE), there is no subsequent UL message to be transmitted, and the UE supports to transmit the received NAS message through directly through the UL message. Further, the UE is provided with valid radio resources for transmitting the received NAS message through directly transmitting the UL message. At this time, the UE transmits the LPP message received from the NAS layer through directly transmitting the UL message. When the above conditions are not met, the UE transmits the LPP message received from the NAS layer in a conventional mode.

For example, the cause for RRC connection setup received by the AS layer of the UE is MO signaling (i.e., signaling initiated by the UE), and there is a subsequent UL message to be transmitted. At this time, the UE transmits the LPP message received from the NAS layer in a conventional mode.

For example, the cause for RRC connection setup received by the AS layer of the UE is MO signaling (i.e., signaling initiated by the UE), and there is no subsequent message to be transmitted. However, the UE is currently provided without any valid resource for transmitting the NAS message through directly transmitting the UL message. At this time, the UE transmits the LPP message received from the NAS layer in a conventional mode.

In some possible embodiments of the present disclosure, the AS layer of the UE further notifies the NAS layer of the UE of whether to transmit the LPP message received from the NAS layer through directly transmitting the UL message. At this time, when the NAS layer of the UE has received a negative feedback from the AS layer, a relevant NAS layer procedure may probably be triggered. For example, the UE initiates a service request procedure, so as to trigger the subsequent transmission of the received LPP message in a conventional mode. In other words, the AS layer of the UE triggers a relevant RRC connection setup or connection resume procedure, and when the UE enters the RRC connected state, it transmits the LPP message to the network device through the DCCH.

In one embodiment of the present disclosure, the UE transmits the LPP message through directly transmitting the UL message, and the LPP message is transmitted by the UE through one RRC message. As shown in FIG. 4, the information processing method includes the following steps.

Step 401: determining, by the AS layer of the UE, that the LPP message is to be transmitted through directly transmitting the UL message. At this time, the RRC message is transmitted by the UE to a Radio Access Network (RAN) node through the CCCH. The RRC message includes: (1) an NAS message in which the to-be-transmitted LPP message is packaged; and (2) the cause for RRC connection setup or connection resume. Specific contents of the cause may refer to those mentioned hereinabove.

When the UE is a UE in the RRC_INACTIVE state, the RRC message further includes an I-RNTI and a resume MAC-I, so as to enable the network device to validate the UE and determine the UE context. When the UE is a UE in the RRC_IDLE state, the RRC message further includes a route identifier, so as to enable the network device to determine an AMF for storing the UE context and/or determine a location management server that serves the UE.

In some possible embodiments of the present disclosure, the RRC message further includes information about whether there is a subsequent DL message. A way for obtaining the information depends on the implementation of the UE, or the information is obtained from the NAS layer or the LPP layer of the UE.

In some possible embodiments of the present disclosure, the RRC message further includes information about whether there is a subsequent UL message. A way for obtaining the information depends on the implementation of the UE, or the information is obtained from the NAS layer or the LPP layer of the UE.

In some possible embodiments of the present disclosure, the RRC message further includes information about whether there is any other subsequent message. A way for obtaining the information depends on the implementation of the UE, or the information is obtained from the NAS layer or the LPP layer of the UE.

In the embodiments of the present disclosure, a radio resource for the transmission of the LPP message is not limited.

Step 402: upon the receipt of the RRC message from the UE, determining, by the RAN node, the UE context or an AMF or LMF to be routed in accordance with the information in the message, and forwarding the LPP message included in the NAS message to the corresponding AMF or LMF, or forwarding the LPP message to the LMF.

Step 403: transmitting, by the RAN node, a corresponding feedback to the UE in accordance with at least one of a feedback from the core network or whether there is a subsequent UL/DL message.

For example, when the RAN node determines that there is no subsequent message for the UE and/or the RAN node has received a feedback indicating the message is forwarded successfully, the RAN node transmits an RRC response message, and releases the UE to be in an appropriate RRC non-connected state. In some possible embodiments of the present disclosure, the RRC response message includes information indicating that the NAS message has been forwarded successfully or the LPP message in the NAS message has been forwarded successfully, and information indicating that the LPP message has been forwarded successfully. In some possible embodiments of the present disclosure, the RRC response message includes an NAS message responded by the core network, and the NAS message includes the LPP message.

For example, when the RAN node fails to determine whether there is a subsequent UL/DL message or determines that there is a subsequent UL/DL message, the RAN node transmits an RRC connection setup or recovery message to the UE, so that the UE enters the RRC connected state. In some possible embodiments of the present disclosure, the message includes the NAS message responded by the core network and including the LPP message, and information indicating that the LPP message has been forwarded successfully. In some possible embodiments of the present disclosure, the message includes information indicating that the NAS information has been forwarded successfully or information indicating that the LPP message in the NAS message has been forwarded successfully.

For example, upon the receipt of a release indicator from the core network, the RAN node transmits an RRC response message to the UE, and releases the UE to be in an appropriate RRC non-connected state. In some possible embodiments of the present disclosure, the RRC response message includes information indicating that the NAS message has been forwarded successfully or the LPP message in the NAS message has been forwarded successfully, or the information indicating that the LPP message has been forwarded successfully. In some possible embodiments of the present disclosure, the RRC response message includes an NAS message responded by the core network, and the NAS message includes an LPP message.

Figure 5:
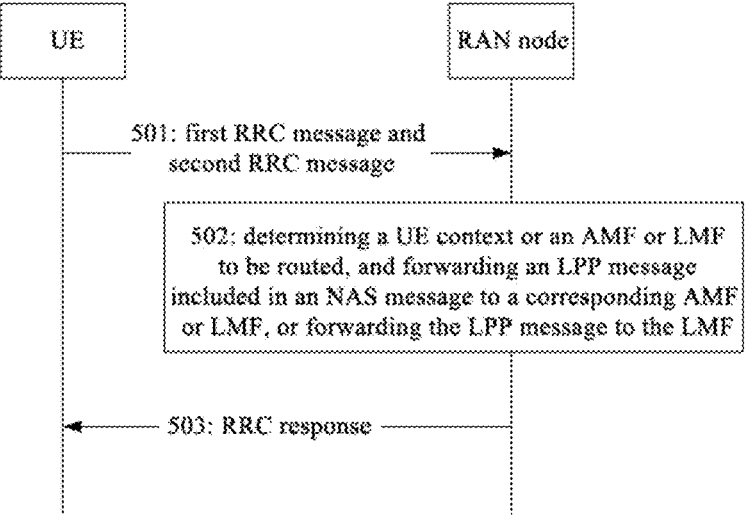
FIG. 5 is still yet another flow chart of the information processing method according to one embodiment of the present disclosure.

In one embodiment of the present disclosure, the UE transmits the LPP message through directly transmitting the UL message, and the LPP is transmitted by the UE through at least two RRC messages. As shown in FIG. 5, the information processing method includes the following steps.

Step 501: determining, by the AS layer of the UE, that the LPP message is to be transmitted through directly transmitting the UL message. At this time, the NAS message (including the LPP message) received from the NAS layer is carried in one RRC message, and the RRC message (i.e., a first RRC message) includes: (1) information indicating whether there is a subsequent DL message (a way for obtaining the information depends on the implementation of the UE, or the information is obtained from the NAS layer or the LPP layer of the UE); (2) information indicating whether is a subsequent UL message (a way for obtaining the information depends on the implementation of the UE, or the information is obtained from the NAS layer or the LPP layer of the UE); and (3) information indicating whether there is any other subsequent message (a way for obtaining the information depends on the implementation of the UE, or the information is obtained from the NAS layer or the LPP layer of the UE).

In addition, another RRC message (i.e., a second RRC message) is generated by the UE, so as to trigger an RRC procedure (i.e., an RRC connection resume procedure in the case that the UE is in the RRC_INACTIVE state, or an RRC connection setup procedure in the case that the UE is in the RRC_IDLE state), thereby to help to determine the UE context stored in the network device, and/or determine a positioning server (i.e., LMF) which serves the UE, and/or control the switching of the RRC state. When the UE is in the RRC_INACTIVE state, it may use an RRC recovery message known in the art, and the RRC recovery message includes an I-RNTI and a resume MAC-I so as to enable the network device to validate the UE and determine the UE context. When the UE is in the RRC_IDLE state, the UE transmits an RRC connection setup request message, and the message includes a route identifier received from the NAS layer, so as to enable the network device to determine an AMF storing the UE context and/or determine a positioning server (i.e., LMF) which serves the UE.

The UE transmits the RRC messages to the RAN node through the CCCH, or transmits a Median Access Control (MAC) layer message including the RRC messages to the RAN node through the CCCH and the DCCH. A specific radio resource used in the transmission is not limited herein.

Step 502: upon the receipt of all the RRC messages from the UE, determining, by the RAN node, the UE context or an AMF or LMF to be routed in accordance with information carried by the second RRC message, and forwarding the NAS message including the LPP message or the LPP message to the corresponding AMF or LMF.

Step 503: transmitting, by the RAN node, a third RRC message in response to the first RRC message, so as to notify the UE of whether the received NAS message has been transmitted successfully, or whether the LPP message has been transmitted successfully. In some possible embodiments of the present disclosure, the third RRC message includes an NAS message responded by the core network, and the NAS message includes an LPP message.

The RAN node transmits a fourth RRC message in response to the second RRC message. The fourth RRC message may use a response message in the RRC connection resume procedure or the RRC connection setup procedure.

Based on the above, in the embodiments of the present disclosure, in the case that the UE is not in the RRC connected state, it transmits the LPP message to the network device through directly transmitting the UL message, so it is able to reduce the delay as well as a signaling overhead.

Figure 6:
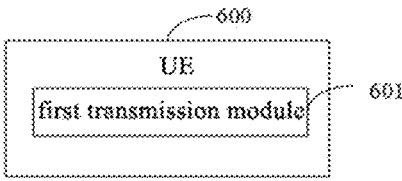
FIG. 6 is a block diagram of a UE according to one embodiment of the present disclosure.

The present disclosure further provides in some embodiments a UE, as shown in FIG. 6. A principle of the UE for solving the problems is similar to that of the above-mentioned information processing method, so the implementation of the UE may refer to that of the information processing method, which will thus not be particularly defined herein.

As shown in FIG. 6, the UE 600 includes a first transmission module 601 configured to transmit a first message to a network device through directly transmitting a UL message when the UE is in a non-connected state, the first message including information related to the positioning of the UE in the RRC non-connected state. The UE in the RRC non-connected state includes at least one of a UE in an RRC idle state or a UE in an RRC inactive state.

In some possible embodiments of the present disclosure, the first message is any of an NAS message carrying an LPP message, or the LPP message.

In some possible embodiments of the present disclosure, the first transmission module 601 is further configured to: transmit the first message to the network device through a CCCH; or transmitting the first message through the CCCH and a DCCH.

In some possible embodiments of the present disclosure, the first transmission module 601 is further configured to transmit a first RRC message to the network device through the CCCH, and the first RRC message includes the first message, and a cause for RRC connection setup or a cause for RRC connection resume.

In some possible embodiments of the present disclosure, when the UE is a UE in the RRC inactive state, the first RRC message further includes an I-RNTI and a resume MAC-I; or when the UE is a UE in the RRC idle state, the first RRC message further includes a route identifier; or the first RRC message further includes first indication information, the first indication information is used to indicate whether there is a subsequent message, and the subsequent message includes at least one of an uplink message or a downlink message.

In some possible embodiments of the present disclosure, the first transmission module 601 is further configured to: transmit a second RRC message to the network device, the second RRC message including the first message; or transmit a third RRC message to the network device, the third RRC message being used to perform at least one of assisting the network device to obtain a context of the UE, assisting the network device to determine a location management server which serves the UE, or assisting the network device to control the switching of an RRC state.

In some possible embodiments of the present disclosure, the second RRC message further includes second indication information, the second indication information is used to indicate whether there is a subsequent message, and the subsequent message includes at least one of an uplink message or a downlink message.

In some possible embodiments of the present disclosure, the UE further includes a first reception module configured to receive an RRC response message from the network device. The RRC response message is used to indicate at least one of: that the NAS message has been forwarded successfully; that the LPP message included in the NAS message has been forwarded successfully; that the RRC response message includes an NAS message received by the network device and responded by a core network, and the NAS message responded by the core network includes the LPP message; or that the LPP message has been forwarded successfully.

In some possible embodiments of the present disclosure, the UE further includes: a second reception module configured to receive, through an AS entity of the UE, first information from an NAS entity of the UE; and a first determination module configured to determine, through the AS entity of the UE, whether to transmit the first message to the network device through directly transmitting the UL message in accordance with the first information, so as to obtain a determination result. The first information includes at least one of: a cause for RRC connection setup or for RRC connection resume; whether data to be transmitted to the network device is LPP data or positioning data; or whether a subsequent message needs to be transmitted, and the subsequent message includes at least one of an uplink message or a downlink message.

In some possible embodiments of the present disclosure, the first determination module is further configured to determine, through the AS entity of the UE, whether to transmit the first message to the network device through directly transmitting the UL message in accordance with a capability of the UE and a configuration of the network device, so as to obtain the determination result.

In some possible embodiments of the present disclosure, the first information further includes at least one of a to-be-transmitted LPP message packaged in the NAS message, or a route identifier.

In some possible embodiments of the present disclosure, the UE further includes a second transmission module configured to transmit, through the AS entity of the UE, the determination result to the NAS entity of the UE.

The UE in the embodiments of the present disclosure is used to implement the above-mentioned information processing method with a similar principle and a similar technical effect, which will not be particularly defined herein.

Figure 7:
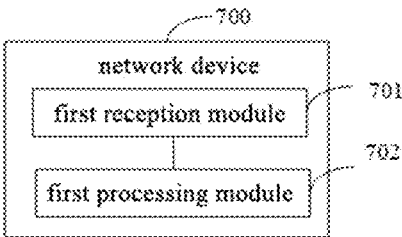
FIG. 7 is a block diagram of a network device according to one embodiment of the present disclosure.

The present disclosure further provides in some embodiments a network device, as shown in FIG. 7. A principle of the network device for solving the problems is similar to that of the above-mentioned information processing method, so the implementation of the network device may refer to that of the information processing method, which will thus not be particularly defined herein.

As shown in FIG. 7, the network device 700 includes: a first reception module 701 configured to receive a first message from a UE in a non-connected state, the first message being transmitted by the UE in the non-connected state through directly transmitting a UL message, the first message including information related to the positioning of the UE in the RRC non-connected state; and a first processing module 702 configured to forward the first message to an AMF or an LMF. The UE in the RRC non-connected state includes at least one of a UE in an RRC idle state or a UE in an RRC inactive state.

In some possible embodiments of the present disclosure, the first message is any of an NAS message carrying an LPP message, or the LPP message.

In some possible embodiments of the present disclosure, the network device further includes a first transmission module configured to transmit an RRC response message to the UE. The RRC response message is used to indicate at least one of: that the NAS message has been forwarded successfully; that the LPP message included in the NAS message has been forwarded successfully; that the RRC response message includes an NAS message received by the network device and responded by a core network, and the NAS message responded by the core network includes the LPP message; or that the LPP message has been forwarded successfully.

The network device in the embodiments of the present disclosure is used to implement the above-mentioned information processing method with a similar principle and a similar technical effect, which will not be particularly defined herein.

Figure 8:
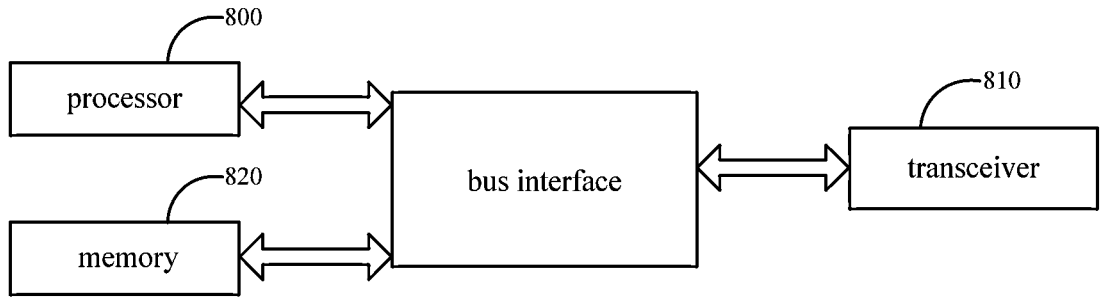
FIG. 8 is another block diagram of the network device according to one embodiment of the present disclosure.

As shown in FIG. 8, the present disclosure further provides in some embodiments a network device, which includes a processor 800, a transceiver 810 and a memory 820. The processor 800 is configured to read a program in the memory 820, so as to: receive a first message from a UE in a non-connected state, the first message being transmitted by the UE in the non-connected state through directly transmitting a UL message, the first message including information related to the positioning of the UE in the RRC non-connected state; and forward the first message to an AMF or an LMF. The UE in the RRC non-connected state includes at least one of a UE in an RRC idle state or a UE in an RRC inactive state. The transceiver 810 is configured to receive and transmit data under the control of the processor 800.

In FIG. 8, bus architecture may include a number of buses and bridges connected to each other, so as to connect various circuits for one or more processors 800 and one or more memories 820. In addition, as is known in the art, the bus architecture may be used to connect any other circuits, such as a circuit for a peripheral device, a circuit for a voltage stabilizer and a power management circuit. A bus interface may be provided, and the transceiver 810 may consist of a plurality of elements, i.e., a transmitter and a receiver for communication with any other devices over a transmission medium. The processor 800 may take charge of managing the bus architecture as well as general processings. The memory 820 may store therein data for the operation of the processor 800.

The processor 800 may take charge of managing the bus architecture as well as general processings. The memory 820 may store therein data for the operation of the processor 800.

In some possible embodiments of the present disclosure, the first message is any of an NAS message carrying an LPP message, or the LPP message.

In some possible embodiments of the present disclosure, the processor 800 is further configured to read the program in the memory, so as to transmit an RRC response message to the UE. The RRC response message is used to indicate at least one of: that the NAS message has been forwarded successfully; that the LPP message included in the NAS message has been forwarded successfully; that the RRC response message includes an NAS message received by the network device and responded by a core network, and the NAS message responded by the core network includes the LPP message; or that the LPP message has been forwarded successfully.

The network device in the embodiments of the present disclosure is used to implement the above-mentioned information processing method with a similar principle and a similar technical effect, which will thus not be particularly defined herein.

Figure 9:
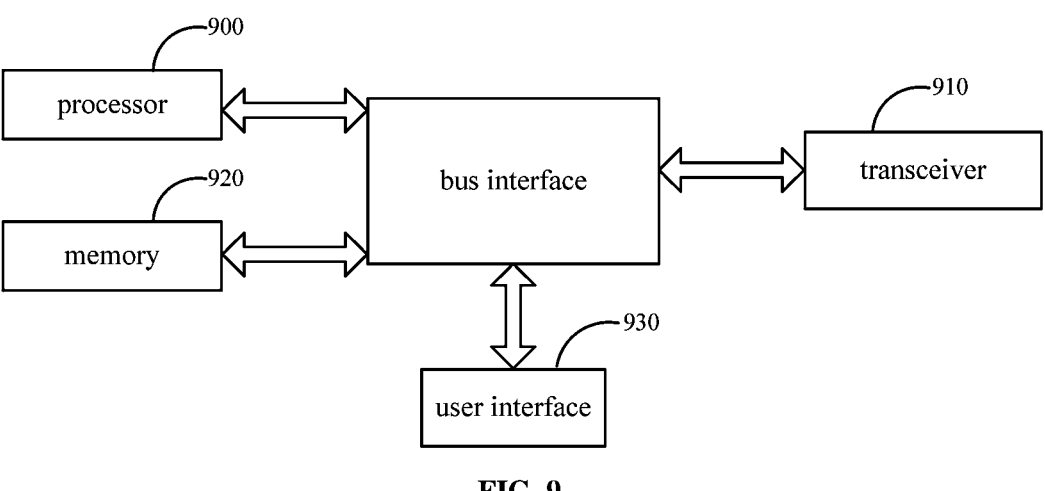
FIG. 9 is another block diagram of the UE according to one embodiment of the present disclosure.

As shown in FIG. 9, the present disclosure further provides in some embodiments a UE, which includes a processor 900, a transceiver 910 and a memory 920. The processor 900 is configured to read a program in the memory 920, so as to transmit a first message to a network device through directly transmitting a UL message when the UE is in an RRC non-connected state, the first message including information related to the positioning of the UE in the RRC non-connected state. The UE in the RRC non-connected state includes at least one of a UE in an RRC idle state or a UE in an RRC inactive state. The transceiver 910 is configured to receive and transmit data under the control of the processor 900.

In FIG. 9, bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. A bus interface may be provided, and the transceiver 910 may consist of a plurality of elements, i.e., a transmitter and a receiver for communication with any other devices over a transmission medium. With respect to different UEs, a user interface 930 may also be provided for devices which are to be arranged inside or outside the UE, and these devices may include but not limited to a keypad, a display, a speaker, a microphone and a joystick.

The processor 900 may take charge of managing the bus architecture as well as general processings. The memory 920 may store therein data for the operation of the processor 900.

In some possible embodiments of the present disclosure, the first message is any of an NAS message carrying an LPP message, or the LPP message.

In some possible embodiments of the present disclosure, the processor 900 is further configured to read the program in the memory, so as to: transmit the first message to the network device through a CCCH; or transmit the first message through the CCCH and a DCCH.

In some possible embodiments of the present disclosure, the processor 900 is further configured to read the program in the memory, so as to transmit a first RRC message to the network device through the CCCH, and the first RRC message includes the first message, and a cause for RRC connection setup or a cause for RRC connection resume.

In some possible embodiments of the present disclosure, when the UE is a UE in the RRC inactive state, the first RRC message further includes an I-RNTI and a resume MAC-I; or when the UE is a UE in the RRC idle state, the first RRC message further includes a route identifier; or the first RRC message further includes first indication information, the first indication information is used to indicate whether there is a subsequent message, and the subsequent message includes at least one of an uplink message or a downlink message.

In some possible embodiments of the present disclosure, the processor 900 is further configured to read the program in the memory, so as to: transmit a second RRC message to the network device, the second RRC message including the first message; or transmit a third RRC message to the network device, the third RRC message being used to perform at least one of assisting the network device to obtain a context of the UE, assisting the network device to determine a location management server which serves the UE, or assisting the network device to control the switching of an RRC state.

In some possible embodiments of the present disclosure, the second RRC message further includes second indication information, the second indication information is used to indicate whether there is a subsequent message, and the subsequent message includes at least one of an uplink message or a downlink message.

In some possible embodiments of the present disclosure, the processor 900 is further configured to read the program in the memory, so as to receive an RRC response message from the network device. The RRC response message is used to indicate at least one of: that the NAS message has been forwarded successfully; that the LPP message included in the NAS message has been forwarded successfully; that the RRC response message includes an NAS message received by the network device and responded by a core network, and the NAS message responded by the core network includes the LPP message; or that the LPP message has been forwarded successfully.

In some possible embodiments of the present disclosure, the processor 900 is further configured to read the program in the memory, so as to: enable an AS entity of the UE to receive first information from an NAS entity of the UE; and enable the AS entity of the UE to determine whether to transmit the first message to the network device through directly transmitting the UL message in accordance with the first information, so as to obtain a determination result. The first information includes at least one of: a cause for RRC connection setup or for RRC connection resume; whether data to be transmitted to the network device is LPP data or positioning data; or whether a subsequent message needs to be transmitted, and the subsequent message includes at least one of an uplink message or a downlink message.

In some possible embodiments of the present disclosure, the processor 900 is further configured to read the program in the memory, so as to enable the AS entity of the UE to determine whether to transmit the first message to the network device through directly transmitting the UL message in accordance with a capability of the UE and a configuration of the network device, so as to obtain the determination result.

In some possible embodiments of the present disclosure, the processor 900 is further configured to read the program in the memory, so as to enable the AS entity of the UE to transmit the determination result to the NAS entity of the UE.

The UE in the embodiments of the present disclosure is used to implement the above-mentioned information processing method with a similar principle and a similar technical effect, which will not be particularly defined herein.

The present disclosure further provides in some embodiments a readable storage medium storing therein a program.

The program is executed by a processor so as to implement the above-mentioned information processing method with a same technical effect, which will not be particularly defined herein. The readable storage medium is a Read-Only Memory (ROM), a Random Access Memory (RAM), a magnetic disk or an optical disk.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

It should be further appreciated that, the above modules in the network device and the UE are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, the determination module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A or B" in the specification and the appended claims shall be understood as "there is only A, there is only B, or there are both A and B".

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information transmission method performed by a User Equipment (UE), the information processing method comprising:

transmitting, by the UE in a Radio Resource Control (RRC) non-connected state, a first message to a network device through directly transmitting an Uplink (UL) message, the first message comprising information related to the positioning of the UE in the RRC non-connected state, wherein the UE in the RRC non-connected state comprises at least one of a UE in an RRC idle state or a UE in an RRC inactive state;

wherein the transmitting the first message to the network device through directly transmitting the UL message comprises: transmitting the first message to the network device through a Common Control Channel (CCCH); or transmitting the first message through the CCCH and a Dedicated Control Channel (DCCH);

wherein the first message is a Non-Access Stratum (NAS) message carrying a Long Term Evolution (LTE) Positioning Protocol (LPP) message;

wherein the first message further includes an Inactive Radio Network Temporary Identity (I-RNTI) and a resume Message Authentication Code for Integrity (MAC-I), when the UE is a UE in the RRC inactive state.

2. The information processing method according to claim 1, wherein the transmitting the first message to the network device through the CCCH comprises: transmitting a first RRC message to the network device through the CCCH, and the first RRC message comprises: the first message, and a cause for RRC connection setup or a cause for RRC connection resume; or wherein the transmitting the first message through the CCCH and the DCCH at least comprises: transmitting a second RRC message to the network device, the second RRC message comprising the first message; and/or transmitting a third RRC message to the network device, the third RRC message being used to perform at least one of assisting the network device to obtain a context of the UE, assisting the network device to determine a location management server which serves the UE, or assisting the network device to control the switching of an RRC state.

3. The information processing method according to claim 2, wherein the first RRC message further comprises at least one of:

when the UE is a UE in the RRC inactive state, the first RRC message further comprises the I-RNTI and the MAC-I; or when the UE is a UE in the RRC idle state, the first RRC message further comprises a route identifier; or the first RRC message further comprises first indication information, the first indication information is used to indicate whether there is a subsequent message, and the subsequent message comprises at least one of an uplink message or a downlink message.

4. The information processing method according to claim 2, wherein the second RRC message further comprises second indication information, the second indication information is used to indicate whether there is a subsequent message, and the subsequent message comprises at least one of an uplink message or a downlink message.

5. The information processing method according to claim 2, the method further comprising:

receiving an RRC response message from the network device, wherein the RRC response message is used to indicate at least one of: that the NAS message has been forwarded successfully; that the LPP message comprised in the NAS message has been forwarded successfully; that the RRC response message comprises an NAS message received by the network device and responded by a core network, and the NAS message responded by the core network comprises the LPP message; or that the LPP message has been forwarded successfully.

6. The information processing method according to claim 1, wherein prior to transmitting the first message to the network device through directly transmitting the UL message, the information processing method further comprises:

receiving, by an Access Stratum (AS) entity of the UE, first information from an NAS entity of the UE; and determining, by the AS entity of the UE, whether to transmit the first message to the network device through directly transmitting the UL message in accordance with the first information, so as to obtain a determination result, wherein the first information comprises at least one of: a cause for RRC connection setup or for RRC connection resume; whether data to be transmitted to the network device is LPP data or positioning data; or whether a subsequent message needs to be transmitted, and the subsequent message comprises at least one of an uplink message or a downlink message.

7. The information processing method according to claim 6, wherein the determining, by the AS entity of the UE, whether to transmit the first message to the network device through directly transmitting the UL message in accordance with the first information so as to obtain the determination result comprises determining, by the AS entity of the UE, whether to transmit the first message to the network device through directly transmitting the UL message in accordance with a capability of the UE and a configuration of the network device, so as to obtain the determination result; or wherein the information processing method further comprises transmitting, by the AS entity of the UE, the determination result to the NAS entity of the UE.

8. An information processing method performed by a network device, the information processing method comprising:

receiving a first message from a UE in a non-connected state, the first message being transmitted by the UE in the non-connected state through directly transmitting a Uplink (UL) message comprising transmitting the first message to the network device through a Common Control Channel (CCCH) or transmitting the first message through the CCCH and a Dedicated Control Channel (DCCH), the first message comprising information related to the positioning of the UE in the a Radio Resource Control (RRC) non-connected state; and forwarding the first message to an Access and Mobility Management Function (AMF) or a Location Management Function (LMF), wherein the UE in the RRC non-connected state comprises at least one of a UE in an RRC idle state or a UE in an RRC inactive state;

wherein the first message is an Non-Access Stratum (NAS) message carrying an Long Term Evolution (LTE) Positioning Protocol (LPP) message;

wherein the first message further includes an Inactive Radio Network Temporary Identity (I-RNTI) and a resume Message Authentication Code for Integrity (MAC-I), when the UE is a UE in the RRC inactive state.

9. A network device, comprising a transceiver, a memory, a processor, and a program stored in the memory and executed by the processor, wherein the processor is configured to read the program in the memory, so as to realize the information processing method according to claim 8.

10. A User Equipment (UE), comprising a transceiver, a memory, a processor, and a program stored in the memory and executed by the processor, wherein the processor is configured to read a program in the memory, so as to transmit a first message to a network device through directly transmitting a Uplink (UL) message when the UE is in an Radio Resource Control (RRC) non-connected state, wherein the first message comprises information related to the positioning of the UE in the non-connected state, and the UE in the RRC non-connected state comprises at least one of a UE in an RRC idle state or a UE in an RRC inactive state;

wherein the processor is further configured to read the program in the memory, so as to: transmit the first message to the network device through a CCCH; or transmit the first message through the CCCH and a DCCH;

wherein the first message is an Non-Access Stratum (NAS) message carrying an Long Term Evolution (LTE) Positioning Protocol (LPP) message;

wherein the first message further includes an Inactive Radio Network Temporary Identity I-RNTI) and a resume Message Authentication Code for Integrity (MAC-I), when the UE is a UE in the RRC inactive state.

11. The UE according to claim 10, wherein the processor is further configured to read the program in the memory, so as to transmit a first RRC message to the network device through the CCCH, and the first RRC message comprises: the first message, and a cause for RRC connection setup or a cause for RRC connection resume; or wherein the processor is further configured to read the program in the memory, so as to: transmit a second RRC message to the network device, the second RRC message comprising the first message; and/or transmit a third RRC message to the network device, wherein the third RRC message is used to perform at least one of assisting the network device to obtain a context of the UE, assisting the network device to determine a location management server which serves the UE, or assisting the network device to control the switching of an RRC state.

12. The UE according to claim 11, wherein the first RRC message further comprises at least one of:

when the UE is a UE in the RRC inactive state, the first RRC message further comprises an the I-RNTI and a the resume MAC-I; or when the UE is a UE in the RRC idle state, the first RRC message further comprises a route identifier; or the first RRC message further comprises first indication information, the first indication information is used to indicate whether there is a subsequent message, and the subsequent message comprises at least one of an uplink message or a downlink message.

13. The UE according to claim 11, wherein the second RRC message further comprises second indication information, the second indication information is used to indicate whether there is a subsequent message, and the subsequent message comprises at least one of an uplink message or a downlink message.

14. The UE according to claim 10, wherein the processor is further configured to read the program in the memory, so as to:

enable an AS entity of the UE to receive first information from an NAS entity of the UE; and enable the AS entity of the UE to determine whether to transmit the first message to the network device through directly transmitting the UL message in accordance with the first information, so as to obtain a determination result, wherein the first information comprises at least one of: a cause for RRC connection setup or for RRC connection resume; whether data to be transmitted to the network device is LPP data or positioning data; or whether a subsequent message needs to be transmitted, and the subsequent message comprises at least one of an uplink message or a downlink message.

15. The UE according to claim 14, wherein the processor is further configured to read the program in the memory, so as to enable the AS entity of the UE to determine whether to transmit the first message to the network device through directly transmitting the UL message in accordance with a capability of the UE and a configuration of the network device, so as to obtain the determination result; or wherein the processor is further configured to read the program in the memory, so as to enable the AS entity of the UE to transmit the determination result to the NAS entity of the UE.

* * * * *